Jan. 15, 1929.
A. H. WADELL
1,698,861
BORING BAR
Filed Nov. 7, 1925
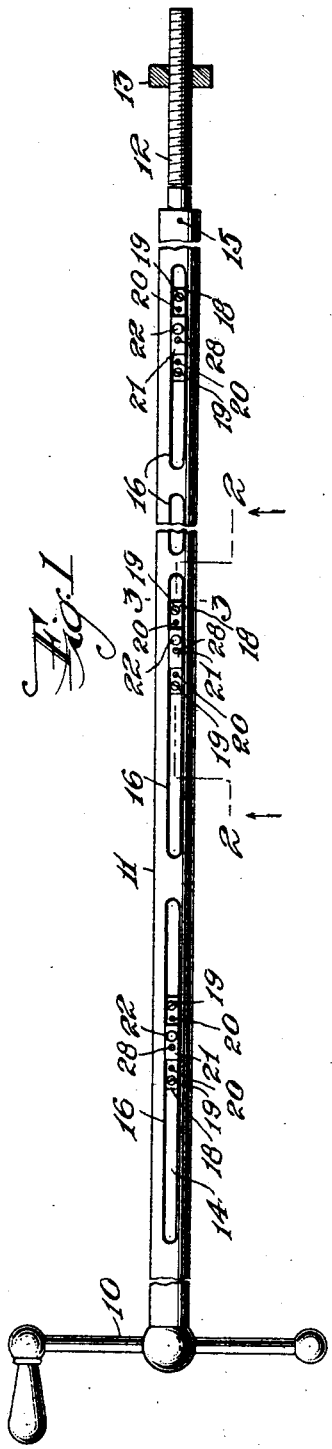
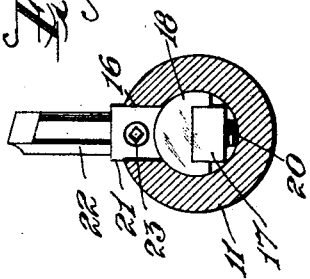
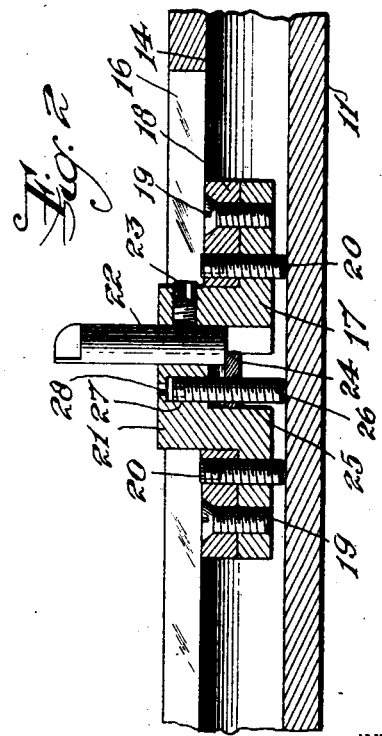
INVENTOR
Albert H. Wadell,
BY
Wm H. Campfield,
ATTORNEY Patented Jan. 15, 1929.

1,698,861

UNITED STATES PATENT OFFICE.

ALBERT H. WADELL, OF NEWARK, NEW JERSEY.

BORING BAR.

Original application filed May 28, 1924, Serial No. 716,389. Divided and this application filed November 7, 1925. Serial No. 67,476.

This invention relates to an improved boring bar which is adapted for use in boring the inside of a cylindrical element such as a bearing and is particularly adapted for use in that type of machine employed in boring the bearings of crank cases, one of such machines being described and illustrated in my application for patent filed May 28, 1924, Serial Number 716,389 and of which case this application is a division.

The object of the invention is to provide a bar in which the tools can be quickly and accurately adjusted, both longitudinally and radially relative to the bar.

The invention is illustrated in the accompanying drawing in which Figure 1 is a top view of the boring bar showing a set of cutters and their holding and adjusting means. Figure 2 is an enlarged section taken on line 2—2 on Figure 1. Figure 3 is an enlarged cross section taken on line 3—3 on Figure 1.

I have not shown a machine in which the bar is used since it is adapted for use in various machines, the bar being mounted in bearings and when it is turned by a suitable handle 10 the said bar shown at 11 is advanced by reason of a screw-threaded part shown at 12, being arranged in a nut 13. The bar 11 or the larger portion of its length is hollow, the bore of 14 extending to one end of the bar, this end receiving the end of extension 12 which can be fastened by a pin 15. The bar is provided with the required number of slots 16 and the bar shown in Figure 1 being broken away in places, illustrates one equipped with four such slots. In the bore of the bar I provide a tool block consisting of a member 17 and a member 18 fastened together by suitable means such as the screws 19. The member 18 is made to fit the upper part of the bore 14 and the block is slidable longitudinally in the bar, and when it is desired to lock it against such sliding movement, the screws 20 are screwed down so that they bind against the bottom of the bar and at the same time press the periphery of the member 18 so that it binds against the inside of the bore. These lock screws 20 are accessible through the slot 16. The member 17 is provided at the center with a bridge 21 which has an opening in which the tool 22 can slide.

The tool when adjusted is held in place by a lock screw 23. In order to adjust the tool, however, I arrange a foot 24 which is prevented against turning by its engagement with the sides of the recess 25 and which is screw-threaded and receives the screw 26. The screw 26 is mounted in a recess 27 in the head 21, which recess, however, is not screw-threaded and when the screw 26 is operated by a key wrench through the opening 28, the tool 22 can be accurately adjusted by forcing it out by means of the foot 24 and it is properly positioned. Then the lock screw 23 is tightened and the tool 22 is held by not only this lock screw but the foot 24.

It will thus be evident that I have devised a boring bar in which the tool can be longitudinally adjusted and also radially adjusted. This adjustment can be quickly accomplished and this with accuracy. It is usual in machines of this kind when boring the bearings of the crank cases of automobile engines, to adjust these tools depending on distance separating bearings, the number of bearings, and their size.

It will be evident, also that slight modifications can be made in the sizes, arrangement, and form of the parts without departing from the scope of the invention.

I claim:

1. A boring bar having a longitudinal bore and a slot, a block fitting the bore and slidable therein, a screw in the block and engaging the wall of the bore for locking the block against movement, a tool in the block, a foot under the tool, and a screw in screw-threaded engagement with the foot and bearing on the bottom of the bore for adjusting the tool.

2. A boring bar having a longitudinal bore and a slot, a block fitting the upper part of the bore and having a bridge extending into the slot, a screw in the block and accessible through the slot and bearing on the bottom of the bore for clamping the block in place, a tool in the bridge of the block, and a screw bearing on the bottom of the bore and disposed so as to be effective on the end of the tool for its adjustment.

In testimony whereof I affix my signature.

ALBERT H. WADELL.